(12) United States Patent
Chen et al.

(10) Patent No.: US 11,533,386 B2
(45) Date of Patent: Dec. 20, 2022

(54) VIRTUAL TUNNEL ENDPOINT (VTEP) LEARNING BASED ON TRANSPORT PROTOCOL INFORMATION

(71) Applicant: VMware, Inc., Palo Alto, CA (US)

(72) Inventors: Dongping Chen, Beijing (CN); Bo Lin, Beijing (CN); Wei Wang, Beijing (CN); Xiao Liang, Beijing (CN); Yi Zeng, Beijing (CN); Xinyu He, Beijing (CN); Dahui Yuan, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 1 day.

(21) Appl. No.: 17/191,729

(22) Filed: Mar. 4, 2021

(65) Prior Publication Data
US 2022/0232109 A1  Jul. 21, 2022

(30) Foreign Application Priority Data

Jan. 15, 2021 (WO) ................ PCT/CN2021/072066

(51) Int. Cl.
*H04L 69/08* (2022.01)
*H04L 61/103* (2022.01)
*H04L 69/18* (2022.01)

(52) U.S. Cl.
CPC ............ *H04L 69/08* (2013.01); *H04L 61/103* (2013.01); *H04L 69/18* (2013.01); *H04L 2212/00* (2013.01)

(58) Field of Classification Search
CPC ....... H04L 69/08; H04L 61/103; H04L 69/18; H04L 2212/00
See application file for complete search history.

(56) References Cited

U.S. PATENT DOCUMENTS

2018/0063193 A1* 3/2018 Chandrashekhar ... G06F 15/177

\* cited by examiner

*Primary Examiner* — Jamal Javaid
*Assistant Examiner* — Shawn D Miller
(74) *Attorney, Agent, or Firm* — Su IP Consulting

(57) ABSTRACT

Example methods and systems for virtual tunnel virtualized computing instance (VTEP) learning based on transport protocol information are described. In one example, a computer system may learn first mapping information and second mapping information. The first mapping information may associate (a) a first VTEP with (b) first transport protocol information and inner address information associated with a first virtualized computing instance. The second mapping information may associate (a) a second VTEP with (b) second transport protocol information and inner address information associated with a second virtualized computing instance. The computer system may detect an egress packet that is addressed to the inner address information. In response to determination that the egress packet specifies the first transport protocol information, a first encapsulated packet may be generated and sent towards the first VTEP. Otherwise, a second encapsulated packet may be generated and sent towards the second VTEP.

21 Claims, 8 Drawing Sheets

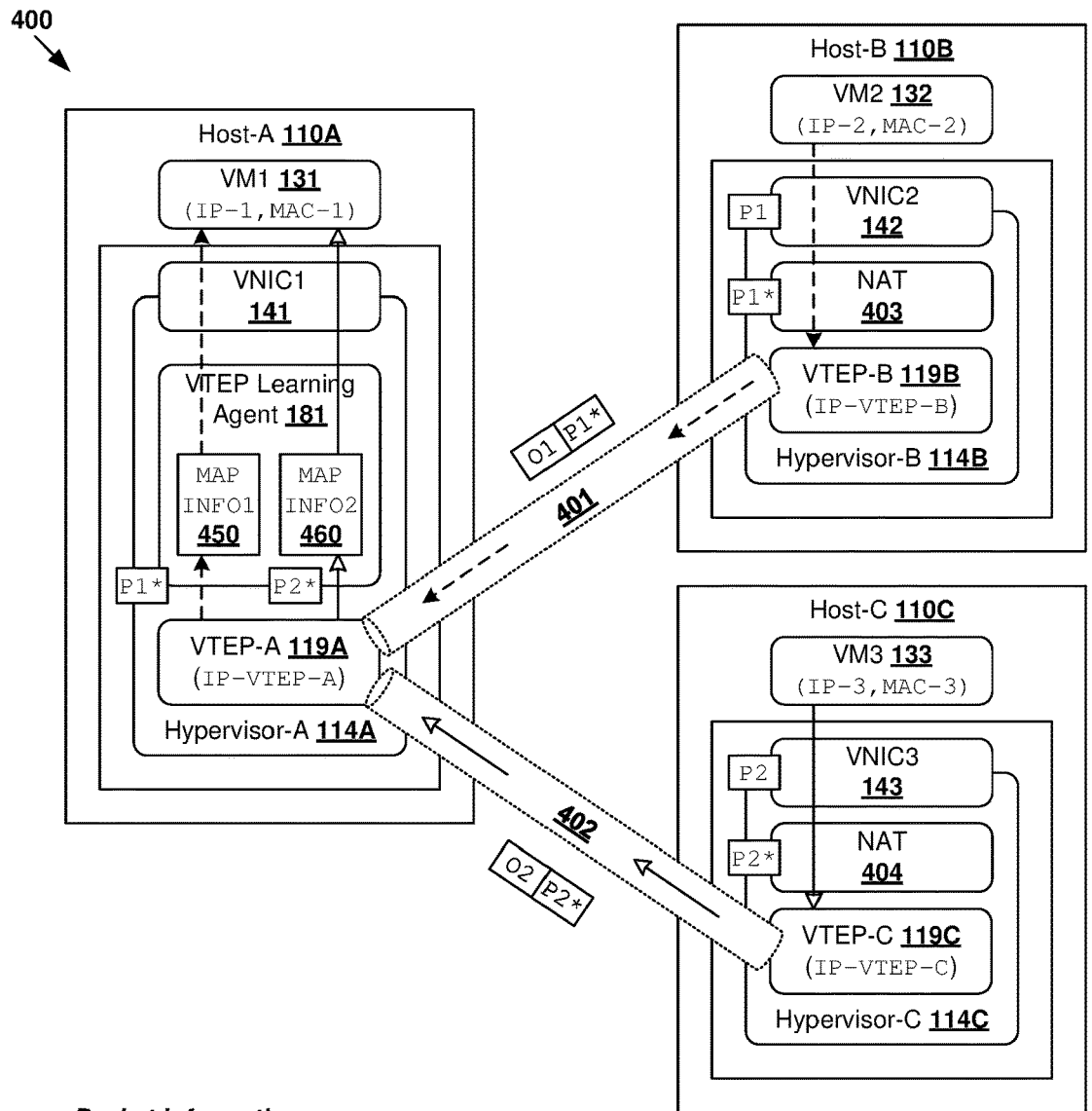

Packet Information

| P1* (ENCAP1) | SMAC=MAC-SHARED,SIP=IP-SHARED,DIP=IP-1<br>SPN=X,DPN=Z,PRO=TCP | ~ 410 |
|---|---|---|
| O1 (ENCAP1) | SVTEP =IP-VTEP-B,DVTEP=IP-VTEP-A<br>VNI=5000 | ~ 420 |
| P2 (ENCAP2) | SMAC=MAC-SHARED,SIP=IP-SHARED,DIP=IP-1<br>SPN=Y,DPN=Z,PRO=TCP | ~ 430 |
| O2 (ENCAP2) | SVTEP =IP-VTEP-C,DVTEP=IP-VTEP-A<br>VNI=5000 | ~ 440 |

Mapping Information

| MAP-INFO1 | VNI=5000,SMAC=MAC-SHARED,SIP=IP-SHARED,<br>DIP=IP-1,SPN=X,DPN=Z,PRO=TCP | IP-VTEP-B | ~ 450 |
|---|---|---|---|
| MAP-INFO2 | VNI=5000,SMAC=MAC-SHARED,SIP=IP-SHARED,<br>DIP=IP-1,SPN=Y,DPN=Z,PRO=TCP | IP-VTEP-C | ~ 460 |

Fig. 4

VIRTUAL TUNNEL ENDPOINT (VTEP) LEARNING BASED ON TRANSPORT PROTOCOL INFORMATION

CROSS-REFERENCE TO RELATED APPLICATION

The present application claims the benefit of Patent Cooperation Treaty (PCT) Application No. PCT/CN2021/072066, filed Jan. 15, 2021, which is incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, a logical overlay tunnel may be established between a pair of virtual tunnel endpoints (VTEPs) to forward packets between a pair of virtualized computing instances (e.g., VMs). To facilitate packet forwarding over various logical overlay tunnels, VTEP learning may be performed to learn mapping information for different pairs of VTEP and VM. In some cases, multiple VMs may be assigned with the same address information, which might lead to a packet being forwarded to the wrong VTEP.

BRIEF DESCRIPTION OF DRAWINGS

FIG. 4 is a schematic diagram illustrating a first example of VTEP learning based on transport protocol information for network address translation (NAT);

DETAILED DESCRIPTION

According to examples of the present disclosure, virtual tunnel endpoint (VTEP) learning may be implemented in an improved manner for virtualized computing instances (e.g., virtual machines (VMs)) that are associated with the same address information, such as Media Access Control (MAC) address, Internet Protocol (IP) address, or both. To differentiate among multiple VMs sharing the same inner hardware and/or network address information, a computer system (e.g., host-A 110A) may learn first mapping information and second mapping information specifying different transport protocol information associated with respective VMs. This should be contrasted against conventional approaches that do not consider VMs having the same address information and therefore disregard the transport protocol information, which might lead packet forwarding towards the wrong VTEP.

Figure 1:
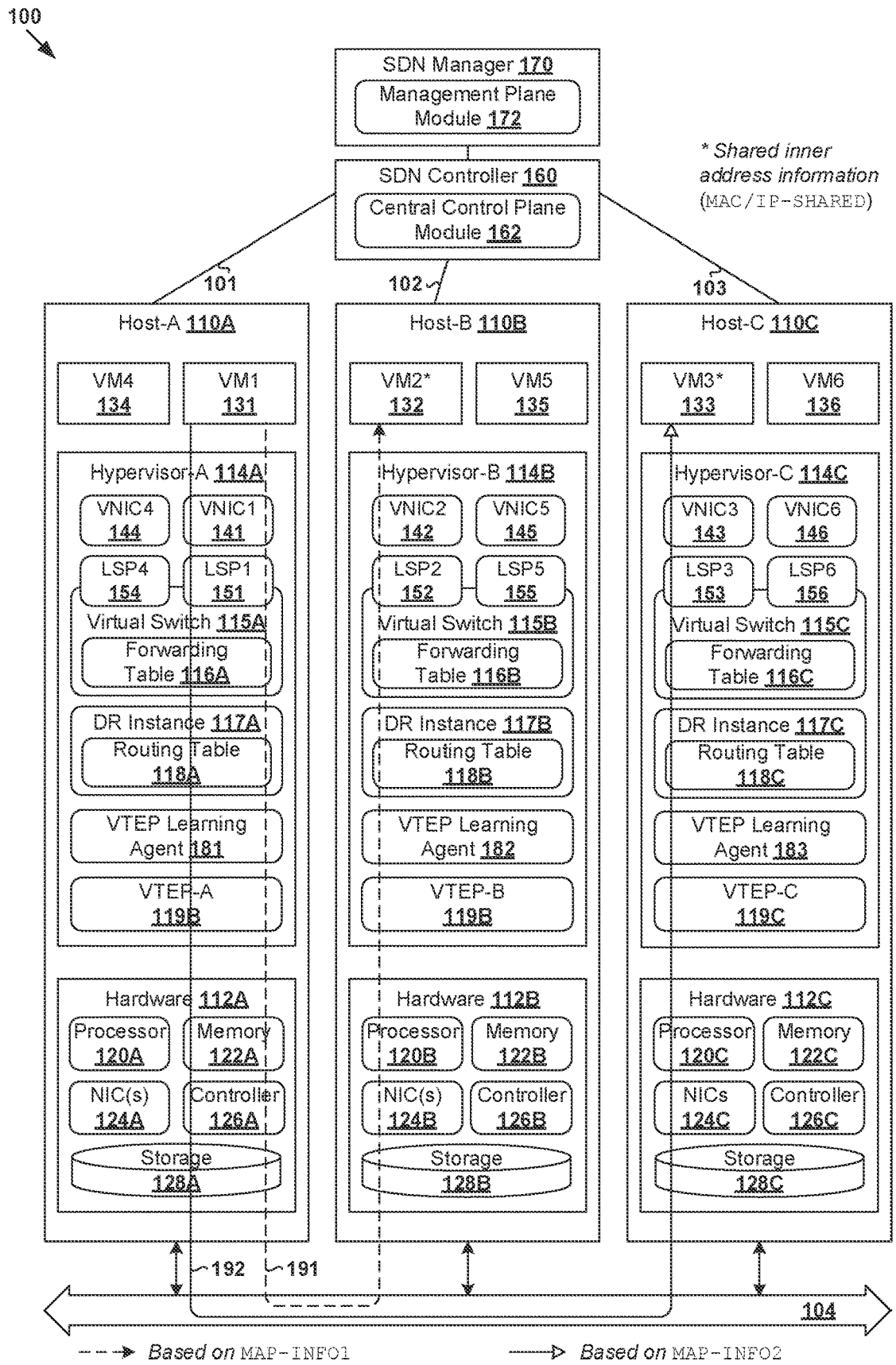
FIG. 1 is a schematic diagram illustrating an example software-defined networking (SDN) environment in which virtual tunnel endpoint (VTEP) learning based on transport protocol information may be performed.

For example in FIG. 1, the first mapping information may associate (a) a first VTEP with (b) first transport protocol information and inner address information associated with a first virtualized computing instance (e.g., VTEP-B 119B and VM2 132 on host-B 110B). The second mapping information may associate (a) a second VTEP with (b) second transport protocol information and inner address information associated with a second virtualized computing instance (e.g., VTEP-C 119C and VM3 133 on host-C 110C). Next, the computer system (e.g., host-A 110A) may detect an egress packet that is addressed to the inner address information. In response to determination that the egress packet specifies the first transport protocol information, a first encapsulated packet may be generated and sent towards the first VTEP (e.g., VTEP-B 119B) based on the first mapping information. Otherwise, a second encapsulated packet may be generated and sent towards the second VTEP (e.g., VTEP-C 119C) based on the second mapping information.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

FIG. 1 is a schematic diagram illustrating example software-defined networking (SDN) environment 100 in which VTEP learning based on transport protocol information may be performed. Depending on the desired implementation, SDN environment 100 may include additional and/or alternative components than that shown in FIG. 1. SDN environment 100 includes multiple hosts, such as host-A 110A, host-B 110B and host-C 110C that are inter-connected via physical network 104. In practice, SDN environment 100 may include any number of hosts (known as a "host computers", "host devices", "physical servers", "server systems", "transport nodes," etc.), each host supporting tens or hundreds of VMs.

Each host 110A/110B/110C may include suitable hardware 112A/112B/112C and virtualization software (e.g., hypervisor-A 114A, hypervisor-B 114B, hypervisor-C 114C)

to support various virtual machines (VMs) 131-136. For example, host-A 110A supports VM1 131 and VM2 132; host-B 110B supports VM3 133 and VM4 134; and host-C 110C supports VM5 135 VM6 136. Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, the virtual resources may include virtual CPU, guest physical memory, virtual disk, virtual network interface controller (VNIC), etc. Hardware resources may be emulated using virtual machine monitors (VMMs). For example in FIG. 1, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or MAC layer; "layer-3" to a network or IP layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs 131-136. In SDN environment 100, logical switches and logical DRs may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding VM (e.g., when the source host and destination host do not have a distributed virtual switch spanning them).

SDN manager 170 and SDN controller 160 are example network management entities in SDN environment 100. For example, SDN manager 170 may reside on a management plane (see module 172) and SDN controller 160 on a central control plane (see module 162). To send and receive the control information (e.g., configuration information), each host 110A/110B/110C may implement local control plane (LCP) agent (not shown) to interact with SDN controller 160. For example, control-plane channel 101/102/103 may be established between SDN controller 160 and host 110A/110B/110C using TCP over Secure Sockets Layer (SSL), etc. Management entity 160/170 may be implemented using physical machine(s), virtual machine(s), a combination thereof, etc. Hosts 110A-C may also maintain data-plane connectivity with each other via physical network 104.

Through virtualization of networking services, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), etc. For example, tunnel encapsulation may be implemented according to a tunneling protocol to extend layer-2 segments across multiple hosts. The term "logical overlay tunnel" in relation to a logical overlay network may refer generally to a tunnel established between a pair of virtual tunnel endpoints (VTEPs) over physical network 104, over which respective hosts are in layer-3 connectivity with one another.

In the example in FIG. 1, hypervisor 114A/114B/114C may implement a VTEP to encapsulate and decapsulate (inner) packets with an outer header (also known as a tunnel header) identifying a logical overlay network (e.g., VNI=5000) to facilitate communication over the logical overlay network. For example, hypervisor-A 114A implements first VTEP-A 119A associated with (IP address=IP-VTEP-A, MAC address=MAC-VTEP-A, VTEP label=VTEP-A), hypervisor-B 114B implements second VTEP-B 119B with (IP-VTEP-B, MAC-VTEP-B, VTEP-B) and hypervisor-C 114C implements third VTEP-C 119C with (IP-VTEP-C, MAC-VTEP-C, VTEP-C). Encapsulated packets may be sent via a logical overlay tunnel established between a pair of VTEPs over physical network 104. In practice, one host may support more than one VTEP.

Conventionally, to facilitate packet forwarding between VM1 131 and VM2 132, host-A 110A may perform VTEP learning to learn mapping information that associates (a) VTEP-B 119B on host-B 110B with (b) an inner MAC/IP address associated with VM2 132. This way, when VM1 131 sends an inner packet that is addressed to the inner MAC/IP address of VM2 132, VTEP-A 119A on host-A 110A may generate and send an encapsulated packet with an outer header that is addressed to VTEP-B 119B. In other words, such conventional approaches only support one-to-one mapping, in that one inner MAC/IP address is only bound to one VTEP. The one-to-one mapping may be inadequate in some practical scenarios where multiple VMs are assigned with the same inner MAC/IP address.

Improved VTEP Learning

According to examples of the present disclosure, VTEP learning may be implemented in an improved manner by learning mapping information that associates (a) multiple VTEPs with (b) the same inner address information assigned to multiple VMs. This way, one-to-many mapping may be supported during VTEP learning, in that one inner MAC/IP address may be bound to multiple VTEPs. For example in FIG. 1, VM2 132 and VM3 133 may be assigned with the same inner MAC/IP address. To distinguish between them, VTEP learning may involve learning transport protocol information (e.g., port number) associated with each VM 132/133.

As used herein, the term "transport protocol information" may refer generally to any suitable information associated with a layer-4 session (e.g., TCP session or UDP) according to the OSI model (or similar). Example transport protocol information may include port number information (e.g., source port number and/or destination port number) and transport protocol information (e.g., TCP or UDP). The term "logical overlay network traffic" may refer generally to encapsulated packet(s) associated with a packet flow between a pair of endpoints (e.g., VMs) that are connected via a logical overlay network. The pair of endpoints may be deployed on the same logical overlay network (e.g., VNI=5000) or different logical overlay networks (e.g., source VNI=5000 to destination VNI=6000).

Throughout the present disclosure, various examples will be explained using host-A 110A as an example "computer system" configured to perform VTEP learning. From the perspective of host-A 110A, VTEP-B 119B and VM2 132 on host-B 110B may be referred to as "first VTEP" and "first virtualized computing instance," respectively. VTEP-C 119C and VM3 133 on host-C 110C may be referred to as "second VTEP" and "second virtualized computing instance," respectively. SDN controller 160 may be referred to as a "management entity." Note that host 110B/110C may implement VTEP learning according to examples of the present disclosure in a similar manner.

Figure 2:
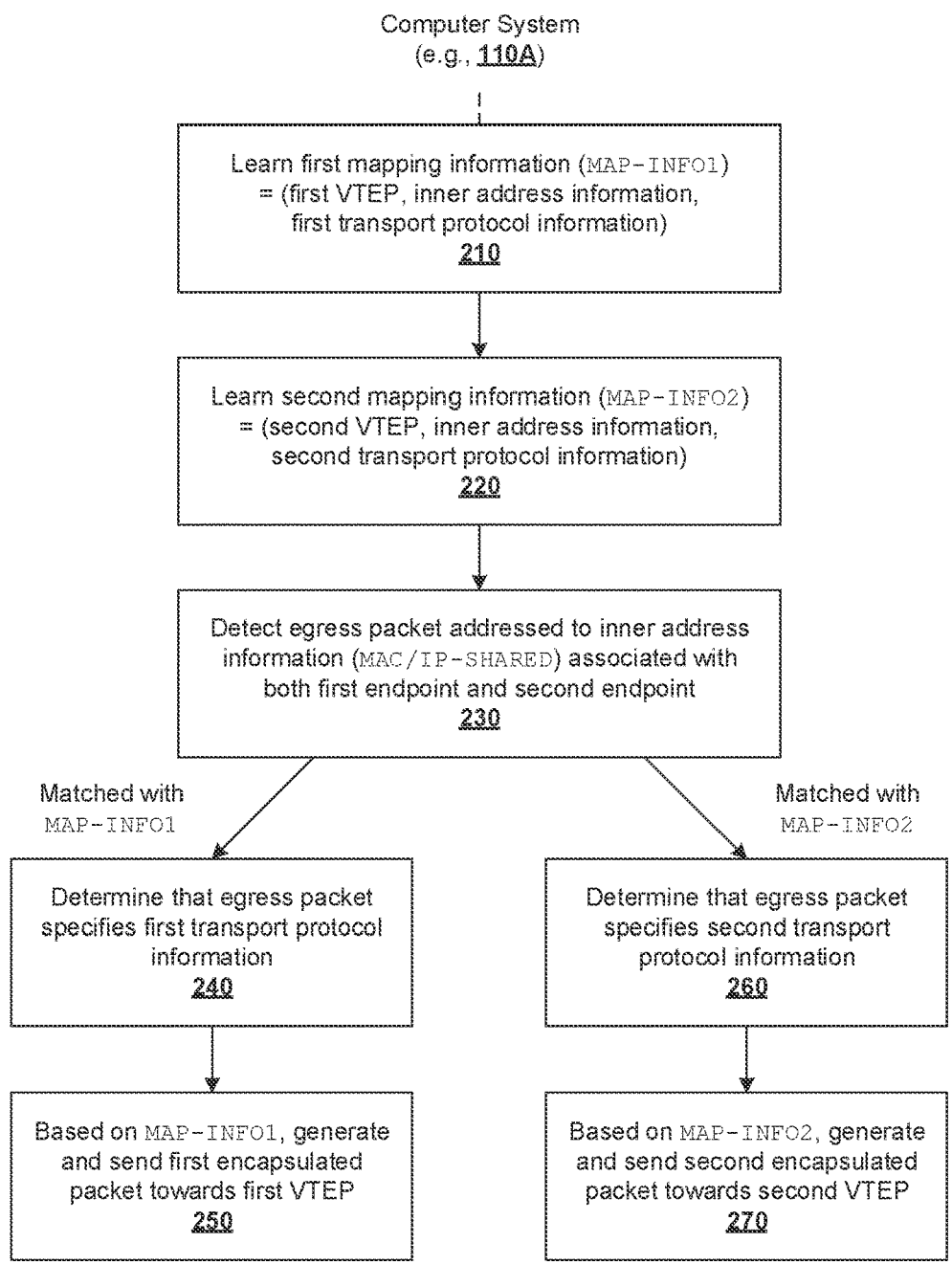
FIG. 2 is a flowchart of an example process for a first computer system to perform VTEP learning based on transport protocol information.

In more detail, FIG. 2 is a flowchart of example process 200 for a computer system to perform VTEP learning based on transport protocol information. Example process 200 may include one or more operations, functions, or actions illustrated by one or more blocks, such as 210 to 270. The various blocks may be combined into fewer blocks, divided into additional blocks, and/or eliminated depending on the desired implementation. In practice, example process 200 may be implemented by any suitable "computer system," such as physical host 110A/110B/110C using hypervisor 114A/114B/114C that supports VTEP learning agent 181/182/183, etc. In practice, VTEP learning agent 181/182/183 may include any suitable hardware and/or software-implemented processing component(s) along a datapath between a pair of endpoints. VTEP learning agent 181/182/183 may be a standalone component or a sub-component of VTEP 119A/119B/119C.

At 210 and 220 in FIG. 2, host-A 110A may learn first mapping information and second mapping information. The first mapping information (MAP-INFO1) may associate (a) first VTEP-B 110B with (b) first transport protocol information and inner address information associated with VM2 132 on host-B 110B. The second mapping information (MAP-INFO2) may associate (a) second VTEP-C 119C with (b) second transport protocol information and inner address information associated with a second virtualized computing instance.

At 230 in FIG. 2, host-A 110A may detect an egress packet that is addressed to the inner address information. At 240 and 250, in response to determination that the egress packet specifies the first transport protocol information, a first encapsulated packet may be generated and sent towards first VTEP-B 110B based on MAP-INFO1. The first encapsulated packet may include the egress packet and a first outer header that is addressed to first VTEP-B 110B. See 191 in FIG. 1.

Otherwise, at 260 and 270 in FIG. 2, in response to determination that the egress packet specifies the second transport protocol information, a second encapsulated packet may be generated and sent towards second VTEP-C 119C based on MAP-INFO2. The second encapsulated packet may include the egress packet and a second outer header that is addressed to second VTEP-C 119C. See 192 in FIG. 1.

As will be described further below, the inner address information may include a shared MAC address (MAC-SHARED) and/or a shared IP address (IP-SHARED) assigned to both VM2 132 and VM3 133. The first transport protocol information in the first mapping information (MAP-INFO1) may include a first port number (e.g., X) assigned to VM2 132 on host-B 110B. The second transport protocol information in the second mapping information (MAP-INFO2) may include a second port number (e.g., Y) assigned to VM3 133 on host-C 110C.

Using a data-plane approach, host-A 110A may learn (MAP-INFO1, MAP-INFO2) at blocks 210-220 based on prior encapsulated packets from first VTEP-B 119B and second VTEP-C 119C. Alternatively or additionally, using a control-plane approach, host-A 110A may learn (MAP-INFO1, MAP-INFO2) based on programming instructions from a control-plane entity, such as SDN controller 160, etc. Using examples of the present disclosure, various enhancements may be implemented in SDN environment 100, such as distributed services for network address translation (NAT) in FIGS. 4-5, load balancing in FIG. 6, flow cache optimization in FIGS. 7-8, etc.

Distributed NAT

Figure 3:
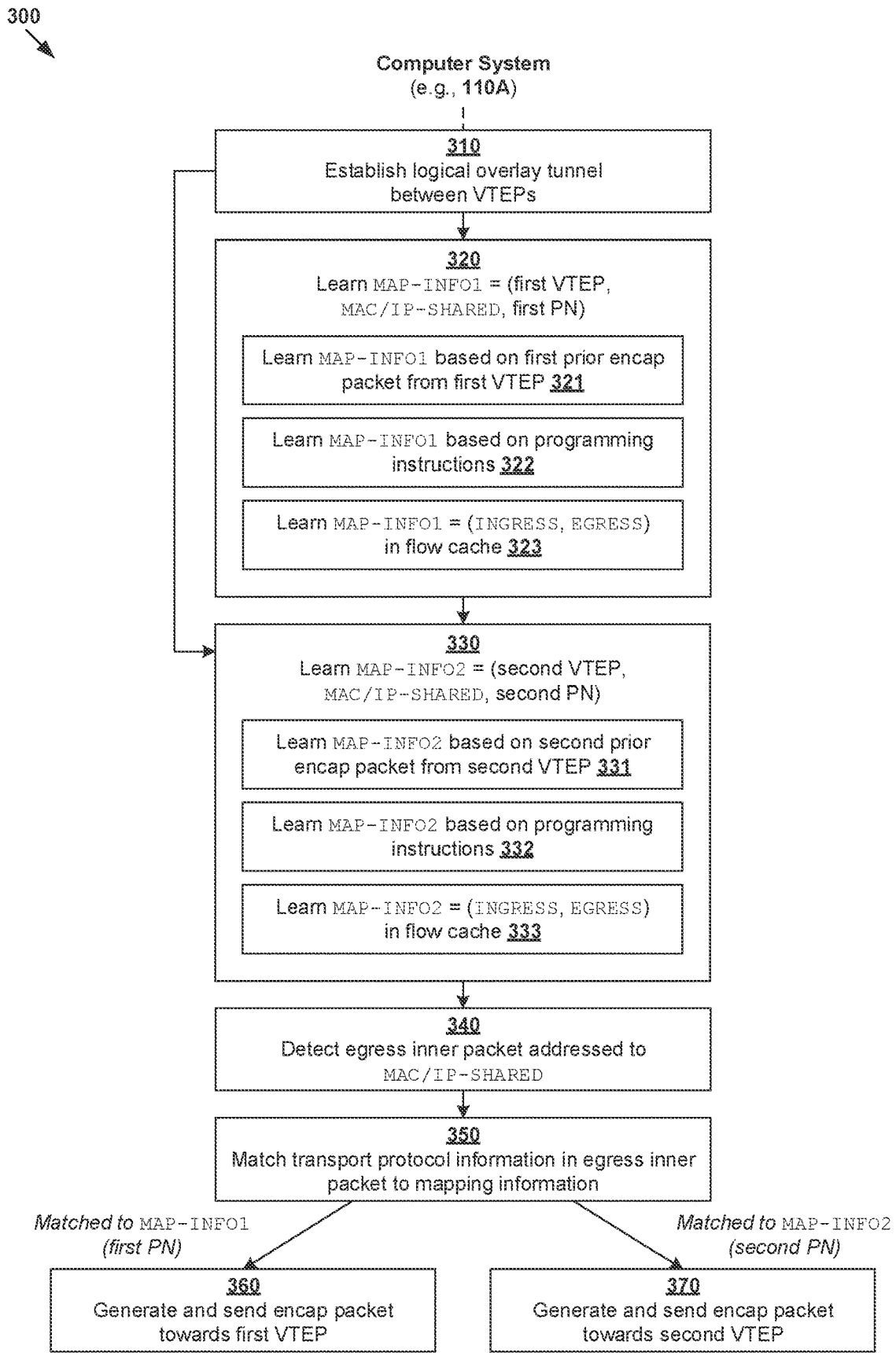
FIG. 3 is a flowchart of an example detailed process for VTEP learning based on transport protocol information.
Figure 5:
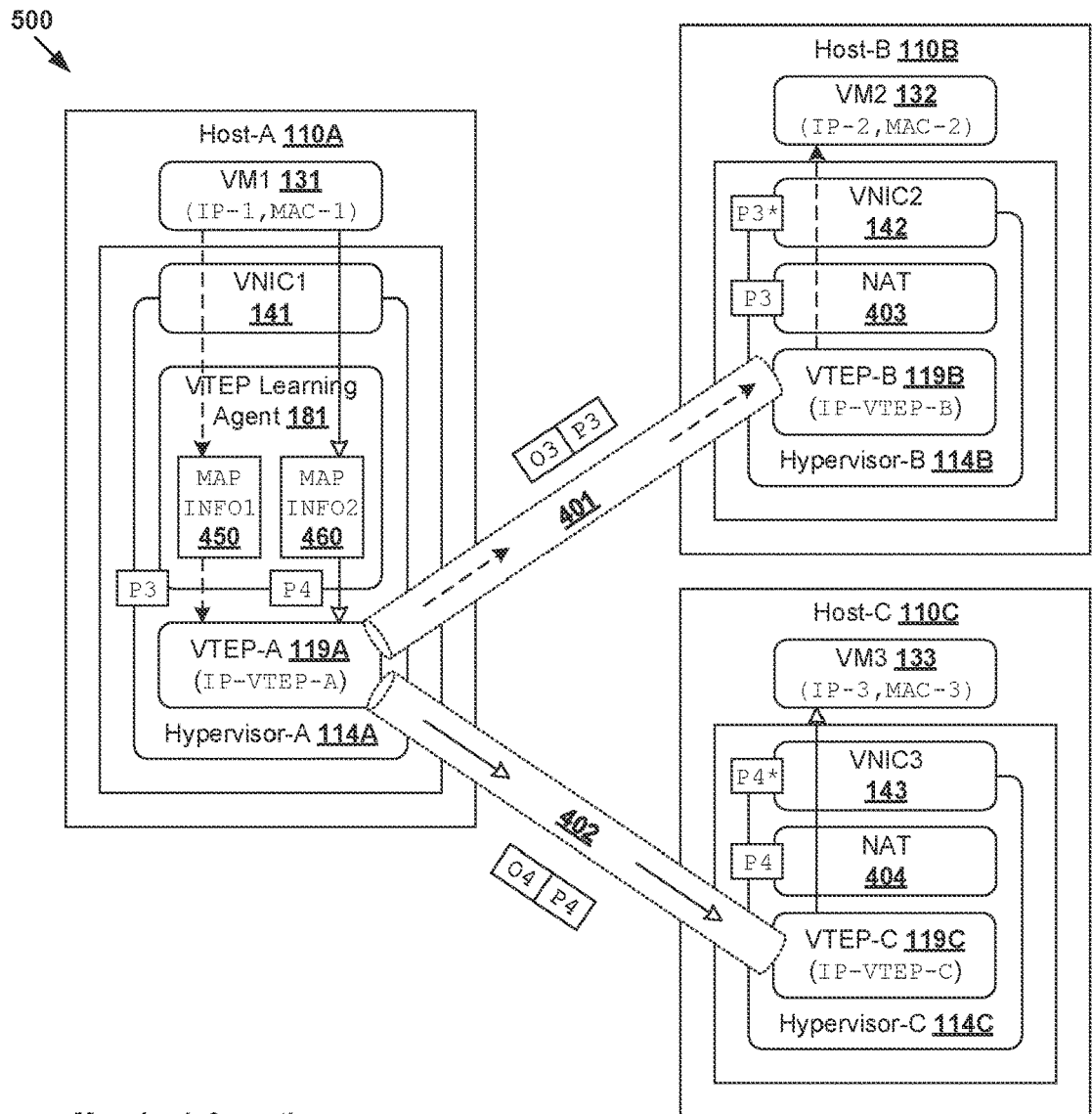
FIG. 5 is a schematic diagram illustrating an example of packet forwarding based on mapping information learned using the example in FIG. 4.

FIG. 3 is a flowchart of example detailed process 300 of VTEP learning based on transport protocol information. Example process 300 may include one or more operations, functions, or actions illustrated at 310 to 370. The various operations, functions or actions may be combined into fewer blocks, divided into additional blocks, and/or eliminated depending on the desired implementation. FIG. 3 will be explained using FIGS. 4-5. In particular, FIG. 4 is a schematic diagram illustrating first example 400 of VTEP learning based on transport protocol information for NAT. FIG. 5 is a schematic diagram illustrating example packet forwarding 500 based on mapping information learned using the example in FIG. 4.

In the following, references will be made to flow tuple information such as source MAC address information (SMAC), source IP address information (SIP), destination IP address information (DIP), source port number (SPN), destination port number (DPN), protocol (PRO), source VTEP information (SVTEP), destination VTEP information (VTEP), source VNI (SVNI), destination VNI (DVNI), etc. Inner header information may include SMAC and 5-tuples (SIP, DIP, SPN, DPN, PRO), while outer header information may include (SVTEP, DTEP, VNI). From the perspective of host-A 110A, VTEP-A 119A is a "local" VTEP while VTEPs 119B-C are "remote" VTEPs supported by respective (remote) hosts 110B-C.

(a) Logical Overlay Tunnels

At 310 in FIG. 3, local VTEP-A 119A may establish multiple logical overlay tunnels with respective first VTEP-B 119B and second VTEP-C 119C. Referring also to FIG. 4, a first logical overlay tunnel (see 401) may be established between VTEP-A 119A and VTEP-B 119B to facilitate communication between VM1 131 and VM2 132. A second logical overlay tunnel (see 402) may be established between VTEP-A 119A and VTEP-C 119C for VM1 131 and VM3 133.

One example tunneling protocol for establishing logical overlay tunnels 401-402 is GENEVE. Example implementation details relating to GENEVE encapsulation may be found in a draft document entitled "GENEVE: Generic Network Virtualization Encapsulation" (draft-ietf-nvo3-geneve-16) published by Internet Engineering Task Force (IETF). The document is incorporated herein by reference.

In the example in FIG. 4, host-B 110B and host-C 110C may be configured to implement a distributed source NAT function using respective network address translators (or NAT modules) 403-404. For example, VM2 132 may be assigned with address information (MAC address=MAC-2, IP address=IP-2) and VM3 133 with (MAC address=MAC-3, IP address=IP-3). During source NAT, the address information may be translated to pre-configured shared MAC/IP address information (MAC-SHARED, IP-SHARED) shared by multiple VMs in SDN environment 100, including VM2 132 and VM3 133.

At 410-420 in FIG. 4, host-B 110B may perform source NAT and encapsulation to generate and send a first prior encapsulated packet (O1, P1*) towards VTEP-A 119A. Here, the asterisk (*) indicates a packet with translated address information. First inner packet (P1*) may specify inner header information (SMAC=MAC-SHARED, SIP=IP-SHARED, DIP=IP-1, SPN=X, DPN=Z, PRO=TCP), where IP address=IP-1 is assigned to VM1 131 on host-A 110A. First outer header (O1) may outer header information (SVTEP=IP-VTEP-B, DVTEP=IP-VTEP-A, VNI=5000).

Similarly, at 430-440 in FIG. 4, host-C 110C may perform source NAT and encapsulation to generate and send a second prior encapsulated packet (O2, P2*) towards VTEP-A 119A on host-A 110A. Second inner packet (P2*) may specify inner header information (SMAC=MAC-SHARED, SIP=IP-SHARED, DIP=IP-1, SPN=Y, DPN=Z, PRO=TCP). Note that SPN=Y assigned to VM3 133 is different to SPN=X assigned to VM2 132. Second outer header (O2) may outer header information (SVTEP=IP-VTEP-C, DVTEP=IP-VTEP-A, VNI=5000).

(b) Learning Mapping Information

At 450 in FIG. 4, in response to receiving the first prior encapsulated packet (O1, P1*) over first logical overlay tunnel 401, VTEP-A 119A may perform decapsulation to remove the first outer header (O1). Based on the first inner packet (P1*), VTEP learning agent 181 may learn first mapping information (MAP-INFO1) that associates (a) VTEP-B 119B with (b) inner header information in the first inner packet (P1*). In particular, MAP-INFO1 may specify VTEP IP address=IP-VTEP-B, SMAC=MAC-SHARED, as well as 5 tuples (SIP=IP-SHARED, DIP=IP-1, SPN=X, DPN=Z, PRO=TCP) associated with VM2 132. See blocks 320-321 in FIG. 3.

At 460 in FIG. 4, in response to receiving the second prior encapsulated packet (O2, P2*) over second logical overlay tunnel 402, VTEP-A 119A may perform decapsulation to remove the second outer header (O2). Based on the second inner packet (P2*), VTEP learning agent 181 may learn second mapping information (MAP-INFO2) that associates (a) VTEP-C 119C with (b) inner header information in the second inner packet (P2*). In particular, MAP-INFO2 may specify VTEP IP address=IP-VTEP-C, SMAC=MAC-SHARED, as well as (SIP=IP-SHARED, DIP=IP-1, SPN=Y, DPN=Z, PRO=TCP) associated with VM3 133. See 330-331 in FIG. 3.

(c) Packet Forwarding to Multiple VTEPs

Referring now to FIG. 5, VM1 131 may send egress packets to either VM2 132 or VM3 133 sharing the same address information based on mapping information 450/460. For example, at 510-520, in response to detecting a first egress packet (P3) from VM1 131, VTEP-A 119A may determine whether there is a match with mapping information 450/460. Based on MAP-INFO1 450, a first encapsulated packet (O3, P3) may be generated and sent over first logical overlay tunnel 401 towards VTEP-B 119B. The first egress packet (P3) may be addressed from source VM1 131 (i.e., SIP=IP-1, SPN=Z) to destination VM2 132 (i.e., DMAC=MAC-SHARED, DIP=IP-SHARED, DPN=X). Based on SPN=X in MAP-INFO1 450 and DPN=X in the first egress packet (P3), VTEP-A 119A may select destination VTEP-B 119B. First outer header (O3) is addressed from VTEP-A 119A to VTEP-B 119B (i.e., SVTEP=IP-VTEP-A, DVTEP=IP-VTEP-B). See 340, 350 and 360 in FIG. 3.

At 530-540 in FIG. 5, in response to detecting a second egress packet (P4) from VM1 131, VTEP-A 119A may generate and send second encapsulated packet (O4, P4) over second logical overlay tunnel 402 towards VTEP-C 119C. The second egress packet (P4) may be addressed from VM1 131 (i.e., SIP=IP-1, SPN=Z) to VM3 133 (i.e., DMAC=MAC-SHARED, DIP=IP-SHARED, DPN=Y). Based on SPN=Yin MAP-INFO2 460 that matches with DPN=Y in the packet, the second egress packet (P4) may be encapsulated with a second outer header (O4) specifying (SVTEP=IP-VTEP-A, DVTEP=IP-VTEP-C). See 340, 350 and 370 in FIG. 3.

Based on FIGS. 4-5, examples of the present disclosure may be implemented to learn one-to-many mapping between shared MAC/IP address information and multiple VTEPs 119B-C. This should be contrasted against conventional VTEP learning approaches that necessitate a one-to-one mapping between a VTEP and one MAC/IP address. For example, based on the first encapsulated packet (O1, P1*), a table entry (IP-VTEP-B, MAC-SHARED) may be recorded. However, the table entry will be replaced by (IP-VTEP-C, MAC-SHARED) based on the second encapsulated packet (O2, P2*). As such, if VM1 131 wishes to send a packet to VM2 132, the packet may be sent to VTEP-C 119C instead of VTEP-B 119B. The risk of this forwarding problem may be reduced, if not eliminated, using mapping information 450/460. By tracking layer-4 session information that includes a unique SPN for each VM 132/133, the correct destination VTEP may be identified.

For some protocols such as address resolution protocol (ARP), note that host-A 110A may learn (VNI, SMAC, SIP, PRO, VTEP) from packets received from hosts 110B-C. In one example, VM2 132 and VM3 133 may share the same IP address (e.g., IP-SHARED) but different MAC addresses (e.g., MAC-2 and MAC-3). In this case, host-A 110A may learn that different VTEPs (e.g., VTEP-B 119B and VTEP-C 119C) may be associated with the same IP address but different MAC addresses. In another example, if both VM2 132 and VM3 133 share the same IP and MAC addresses, host-A 110A may learn that multiple VTEPs are associated with (IP-SHARED, MAC-SHARED). In this case, egress packets that are addressed to (IP-SHARED, MAC-SHARED) will be broadcasted towards VTEP-B 119B and VTEP-C 119C.

(d) Policy-Based Mapping Information

Depending on the desired implementation, mapping information 450/460 may be associated with a policy, such as to facilitate tuple translation for egress packets. In this case, mapping information learned using agent 181 may associate a translation policy with tuple information (VNI, SMAC, SIP, SPN, DIP, DPN, PRO). The translation policy may specify an action to translate (a) matching tuple information to (b) translated tuple information, such as (translated VNI, translated SMAC, translated SIP, translated SPN, translated DIP, translated DPN, translated PRO, VTEP).

In response to detecting an egress packet that matches with (VNI, SMAC, SIP, SPN, DIP, DPN, PRO), host-A 110A (e.g., using a dispatching engine) may translate the matching MAC, IP and TCP/UDP protocol information to (translated SMAC, translated SIP, translated SPN, translated DIP, translated DPN, translated PRO). VTEP-A 119A may then encapsulate the egress packet with an outer header specifying (translated VNI, translated VTEP).

Load Balancing

Using examples of the present disclosure, load balancing may be implemented to distribute traffic among multiple backend servers sharing the same address information. Some examples will be described using FIG. 6, which is a schematic diagram illustrating second example 600 of VTEP learning based on transport protocol information for load balancing. In practice, load balancing helps in achieving optimal resource utilization, maximizing throughput, minimizing response time and reducing overload.

Figure 6:
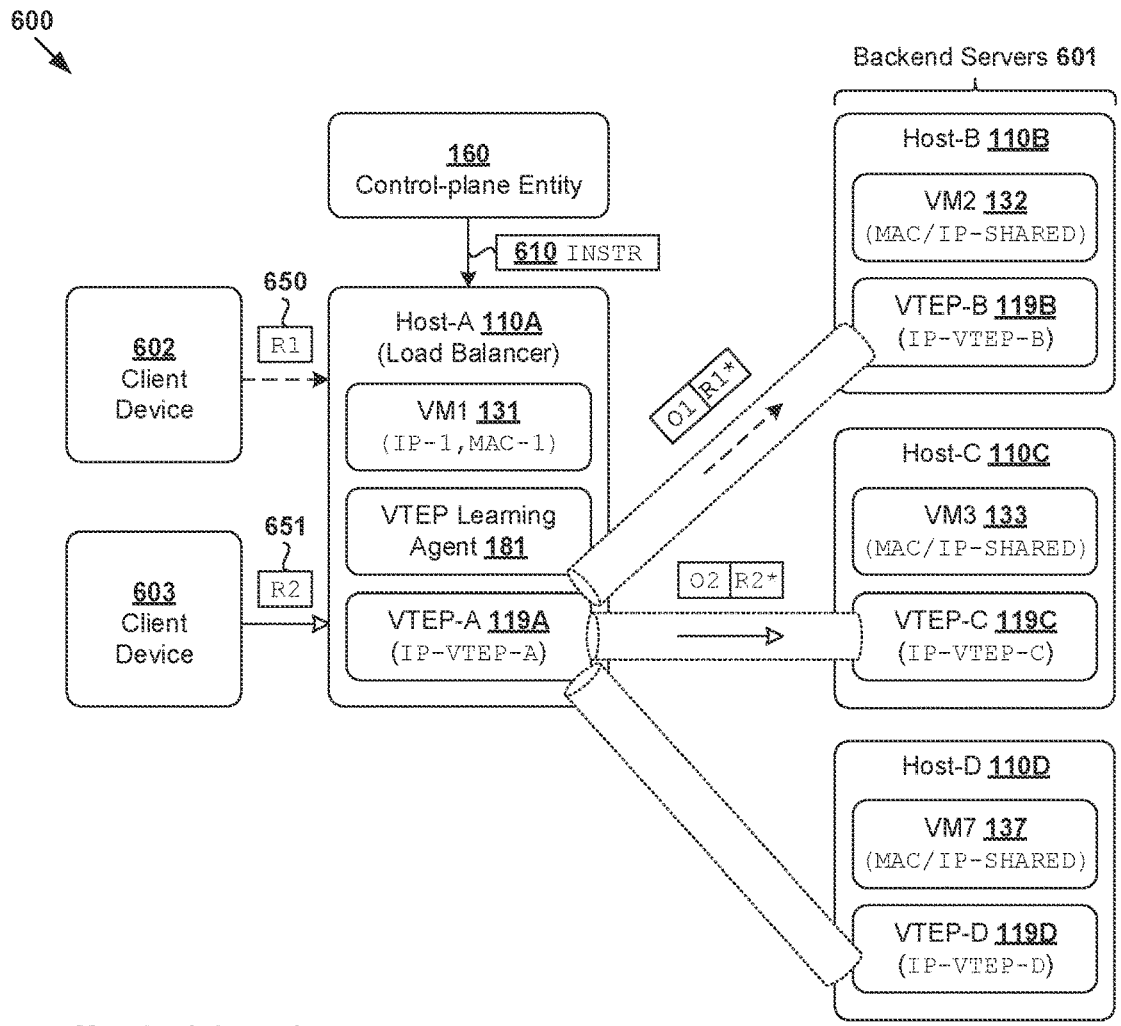
FIG. 6 is a schematic diagram illustrating a second example of VTEP learning based on transport protocol information for load balancing.

In the example in FIG. 6, VM1 131 supported by host-A 110A may be a load balancer to distribute incoming packets from client devices 602-603 among a pool of multiple (N) backend servers (see 601) that includes VM2 132 on host-B 110B, VM3 133 on host-C 110C, VM7 137 on host-D 110D etc. Backend servers 601 may be assigned with the same virtual address information (MAC-SHARED, IP-SHARED). Any suitable load balancing algorithm may be used by VM1 131, such as round robin, hash function, etc. To distinguish between different backend servers, a different port number may be associated with each backend server.

(a) Learning Mapping Information

At 610 in FIG. 6, host-A 110A (e.g., using VTEP learning agent 181) may receive programming instructions to learn mapping information (see 620, 630, 640) that associates multiple VTEPs with the same virtual address information. Programming instructions may be received from any suitable management entity, such as SDN controller 160 (i.e., control-plane entity), SDN manager 170, etc. Note that the programming approach in FIG. 6 may be implemented instead of, or together with, the learning approach based on ingress packets in FIG. 4.

At 620 in FIG. 6, first mapping information (MAP-INFO1) may associate VTEP IP address=IP-VTEP-B with (SMAC=MAC-SHARED, SIP=IP-SHARED, DIP=IP-1, SPN=X, DPN=Z, PRO=TCP), where SPN=X is uniquely associated with VM2 132 within backend server pool 601. At 630, second mapping information (MAP-INFO2) may associate IP-VTEP-C with (SMAC=MAC-SHARED, SIP=IP-SHARED, DIP=IP-1, SPN=Y, DPN=Z, PRO=TCP), where SPN=Y is uniquely associated with VM3 133 within pool 601. At 640, third mapping information (MAP-INFO3) may associate IP-VTEP-D with (SMAC=MAC-SHARED, SIP=IP-SHARED, DIP=IP-1, SPN=K, DPN=Z, PRO=TCP), where SPN=K is uniquely associated with VM7 137 within pool 601. Similar mapping information may be learned for other backend servers, each being associated with a different port number.

(b) Packet Forwarding

At 650 in FIG. 6, in response to detecting a first service request (R1) from first client device 602, host-A 110A may select VM2 132 according to a load balancing algorithm. Based on the first service request, a first egress packet (R1*) may be generated to specify (DMAC=MAC-SHARED, DIP=IP-SHARED, SIP=IP-1, DPN=X, SPN=Z, PRO=TCP) that matches with MAP-INFO1 (see 620). At 660-670, VTEP-A 119A may generate and send a first encapsulated packet (O1, R1*) towards VTEP-B 119B to reach VM2 132. The outer header (O1) may be configured to specify (VNI=5000, SVTEP=IP-VTEP-A, DVTEP=IP-VTEP-B).

At 651 in FIG. 6, in response to detecting a second service request (R2) from second client device 602, host-A 110A may select VM3 133 according to the load balancing algorithm. Based on the second service request, a second egress packet (R2*) may be generated to specify (DMAC=MAC-SHARED, DIP=IP-SHARED, SIP=IP-1, DPN=Y, SPN=Z, PRO=TCP) that matches with MAP-INFO2 (see 630). At 680-690, VTEP-A 119A may generate and send a second encapsulated packet (O2, R1*) towards VTEP-C 119C to reach VM3 133. The outer header (O2) may be configured to specify (VNI=5000, SVTEP=IP-VTEP-A, DVTEP=IP-VTEP-C).

Using the example in FIG. 6, the load balancer may reach multiple VTEPs associated with different backend servers sharing the same address information. Again, this should be contrasted against conventional approaches that only associate (MAC-SHARED, IP-SHARED) with one VTEP. In practice, host-A 110A may further learn client-server relationship to distribute packets from the same client to the same backend server, such as from first client device 602 towards VTEP-B 119B and VM2 132, from second client device 603 towards VTEP-C 119C and VM3 133.

Flow Cache Optimization

In datapath design, forwarding engines may be programmed with a "fast path" to accelerate packet forwarding. Conventionally, the inner tuple information of a packet is generally used to identify (a) an output logical router interface, (b) inner traffic next-hop gateway of a destination IP address and (c) an inner MAC of the gateway or an inner MAC of a directly-connected network destination IP address. For example, the inner traffic may be a packet from a source endpoint (e.g., SIP=1.1.1.1) to a destination endpoint (e.g., DIP=2.2.2.2). The packet may be sent to a (default) next-hop gateway (e.g., 1.1.1.253) for routing before being forwarded towards the destination endpoint. The inner MAC of the packet may be the MAC associated with the gateway (e.g., MAC-GW). In this case, conventional fast-path processing does not support one-to-many mapping between a single virtual MAC/IP address with multiple VTEPs.

According to examples of the present disclosure, flow cache optimization may be performed by learning mapping information associating multiple VTEPs with the same inner address information and different inner layer-4 session information (i.e., transport protocol information). Some examples will be explained using FIG. 7, which is a schematic diagram illustrating third example 700 of VTEP learning based on transport protocol information for flow cache optimization. In this example, host-A 110A may be configured with flow cache information 701 (e.g., flow cache table) to facilitate fast-path processing for multiple packet flows. See also blocks 323 and 333 in FIG. 3.

(a) Ingress-Egress Mapping Information

Figure 7:
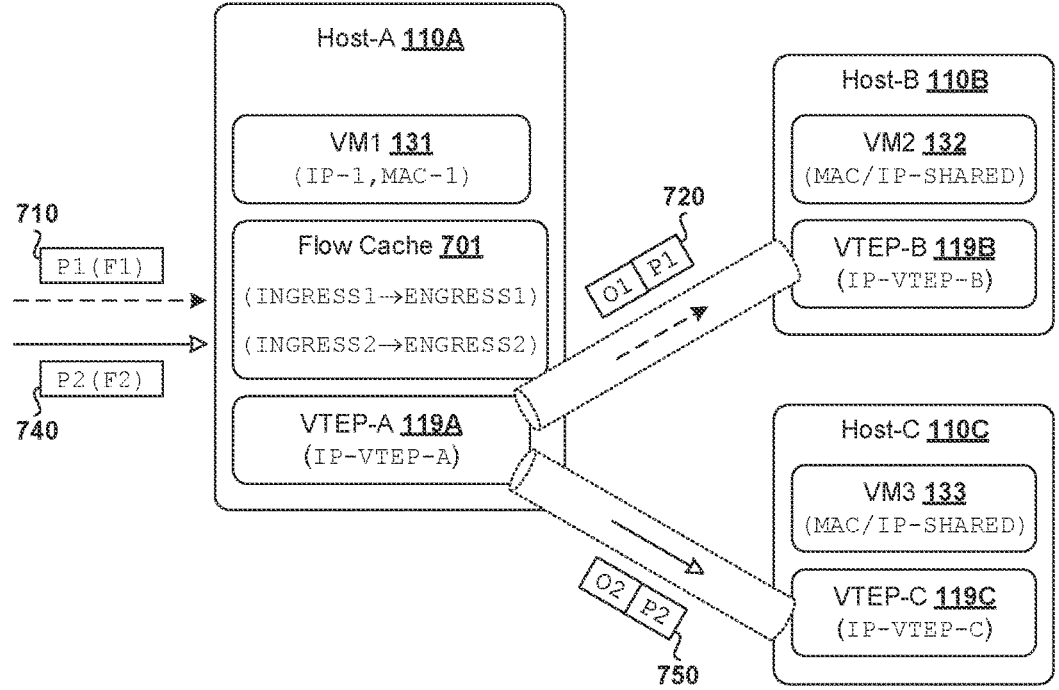
FIG. 7 is a schematic diagram illustrating a third example of VTEP learning based on transport protocol information for flow cache optimization.

At 710-720 in FIG. 7, in response to detecting a first ingress packet (P1) belonging to a first packet flow=F1, host-A 110A may generate and send a first egress encapsulated packet (O1, P1) towards VTEP-B 119B on host-B 110B. This is known as slow-path processing, which is performed without any flow cache information (i.e., flow cache miss event). To facilitate fast-path processing for subsequent packets belonging to the same flow, host-A 110A may learn, in a flow cache, first mapping information 730 (i.e., flow cache information) that includes (a) ingress information (i.e., inner session tuples) and (b) egress information that identifies an output logical interface, destination VTEP and a physical interface (PHY).

At 731, the ingress information (INGRESS1) may be configured based on the first ingress packet (P1) to specify SVNI, SMAC, SPN, DIP, DMAC=MAC-SHARED, DIP=IP-SHARED, PRO=TCP. At 732, the egress information (EGRESS1) may be configured based on the first egress packet (O1, P1) to specify DVNI, SIP, SMAC associated with a first output logical router interface, SPN, DIP=IP-SHARED, DMAC=MAC-SHARED, DPN=X, PRO=TCP, DTEP=IP-VTEP-B associated with VTEP-B 119B on host-B 110B and a first PHY=PNIC1.

At 740-750, in response to detecting a second ingress packet (P2) belonging to a second packet flow=F2, host-A 110A may generate and send a second egress encapsulated packet (O2, P2) towards VTEP-C 119C on host-C 110C. Similarly, to facilitate fast-path processing for subsequent packets belonging to the same flow, host-A 110A may learn second mapping information 760 (i.e., flow cache information).

At 761, based on inner session tuples from the second ingress packet (P2), ingress information (INGRESS2) may be configured to specify SVNI, SMAC, SPN, DIP, DMAC=MAC-SHARED, DIP=IP-SHARED, PRO=TCP. At 762, the egress information (EGRESS2) may be configured based on the second egress packet (O2, P2) to specify DVNI, SIP-2, SMAC associated with a second output logical router interface, SPN, DIP=IP-SHARED, DMAC=MAC-SHARED, DPN=X, PRO=TCP, DTEP=IP-VTEP-C associated with VTEP-C 119C on host-C 110C and a second PHY=PNIC2.

For a subsequent packet belonging to the same flow 710/740, mapping information 730/760 may be applied to improve the efficiency of packet forwarding at host-A 110A. In particular, based on mapping information 730/760 host-A 110A may merge inner lookup operation(s) with outer VTEP lookup operation(s) in one match to achieve better forwarding performance.

In practice, if the same output logical router interface is used for both EGRESS1 from F1 and EGRESS2 from F2, first SMAC learned from F1 (see 732) and second SMAC learned from F2 (see 762) are the same. This may be observed in cases where multiple flows are routed by the same logical router. Further, in the example in FIG. 7, first DVTEP=IP-VTEP-B (see 732) and second DVTEP=IP-VTEP-C (see 762) may be reachable via different physical interfaces, i.e., PNIC1 for IP-VTEP-B and PNIC2 for IP-VTEP-C. In alternative implementation(s), multiple VTEPs may be reachable via the same physical interface.

(b) Path Merging

Figure 8:
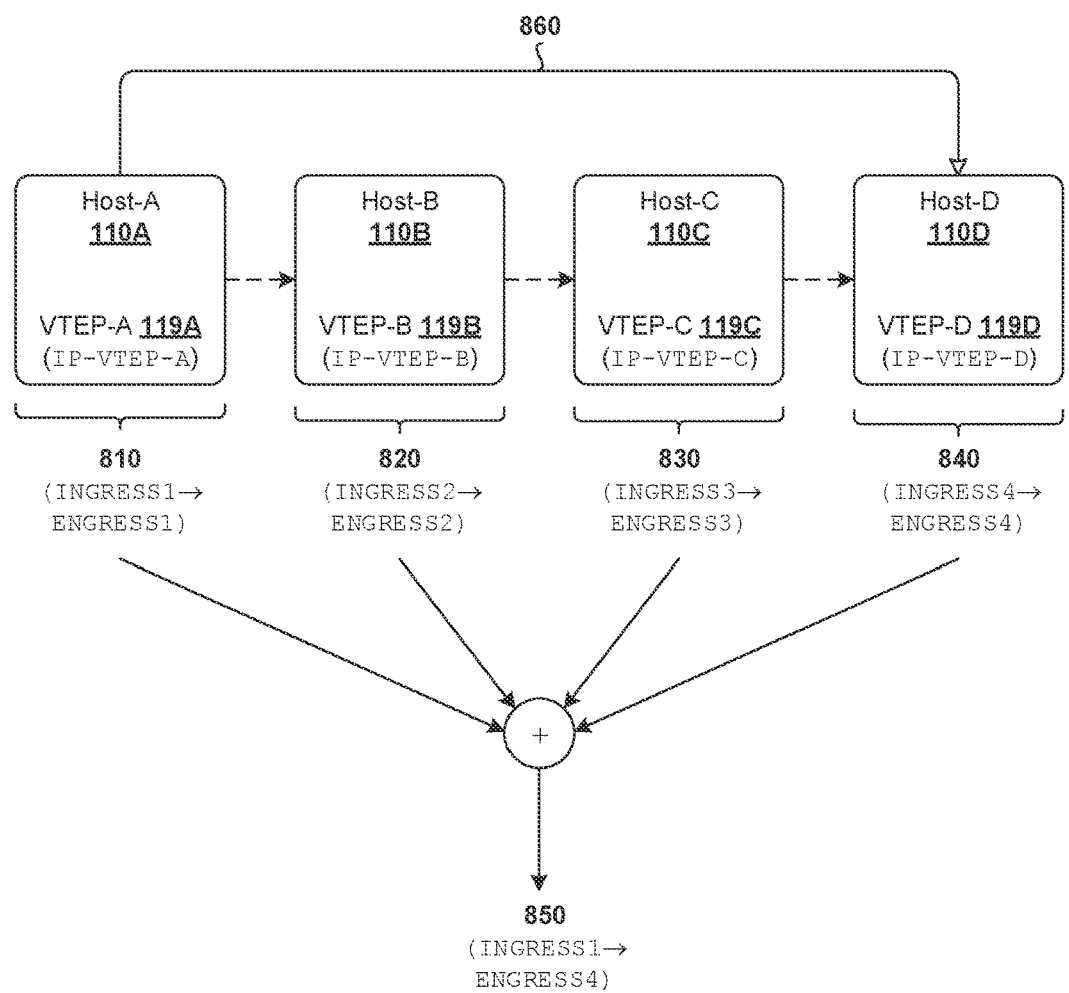
FIG. 8 is a schematic diagram illustrating a fourth example of VTEP learning based on transport protocol information for path merging.

In scenarios where packet forwarding involves multiple hops, multiple paths may be merged into one flow cache entry to further improve efficiency. An example is shown in FIG. 8, which is a schematic diagram illustrating fourth example 800 of VTEP learning based on transport protocol information for path merging. Here, packet forwarding may involve multiple hops in the form of VTEPs 119A-D supported by respective hosts 110A-D. Packets are forwarded from first VTEP-A 119A to second VTEP-B 119B, then to third VTEP-C 119C and finally to fourth VTEP-D 119D.

Using flow cache optimization explained using FIG. 7, host-A 110A may be configured with a first set of ingress-egress mapping information=(INGRESS1, EGRESS1), host-B 110B with second set=(INGRESS2, EGRESS2), host-C 110C with third set=(INGRESS3, EGRESS3) and host-D 110D with fourth set=(INGRESS4, EGRESS4). See corresponding 810-840 in FIG. 8. To improve packet forwarding performance, host-A 110A may learn all sets of ingress-egress mapping information 810-840, such as based on report information from hosts 110B-D, programming instructions from SDN controller 160, etc.

At 850 in FIG. 8, host-A 110A may merge ingress-egress mapping information 810-840 to generate merged mapping information=(INGRESS1, EGRESS4). In this example, path merging may be performed based on EGRESS1=INGRESS2 at host-B 110B, EGRESS2=INGRESS3 at host-C 110C and EGRESS3=INGRESS4 at host-D 110D. This way, at 860, an ingress packet specifying INGRESS1 may be processed based on (INGRESS1, EGRESS4) to generate and send an egress encapsulated packet towards VTEP-D 110D directly. Intermediate hops VTEP-B 119B and VTEP-C 119C are bypassed accordingly.

Through flow cache optimization and path merging, the number of hops may be reduced to improve packet forwarding efficiency. In practice, path merging may be implemented for distributed services that involve multiple transport nodes that process layer-3 or layer-4 (TCP/UDP) header information without modifying any packet payload information. The (merged) header information modifications may be implemented by one transport node instead of multiple transport nodes.

Container Implementation

Although explained using VMs, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

For the container case, privileged containers may experience the security risks discussed using FIG. 1. For example, user identifier (UID) 0 in a container may behave the same in that container as it does on a computer system supporting the container. In practice, privileged containers are generally difficult to secure. Using examples of the present disclosure, authentication information may be generated and included in encapsulated packets having respective inner packets from a container associated with a trusted zone. Various examples discussed using FIG. 1 to FIG. 8 are also applicable here and will not be repeated for brevity.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. The instructions or program code, when executed by the processor of the computer system, may cause the processor to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform virtual tunnel endpoint (VTEP) learning based on transport protocol information, wherein the method comprises:
    learning first mapping information that associates (a) a first VTEP with (b) first transport protocol information and inner address information associated with a first virtualized computing instance;
    learning second mapping information that associates (a) a second VTEP with (b) second transport protocol information and the inner address information associated with a second virtualized computing instance;
    detecting an egress packet that is addressed to the inner address information associated with both the first virtualized computing instance and the second virtualized computing instance; and
    in response to determination that the egress packet specifies the first transport protocol information, generating and sending a first encapsulated packet that includes the egress packet towards the first VTEP based on the first mapping information;
    otherwise, in response to determination that the egress packet specifies the second transport protocol information, generating and sending a second encapsulated packet that includes the egress packet towards the second VTEP based on the second mapping information.

2. The method of claim 1, wherein learning the first mapping information and the second mapping information comprises:
    learning the first mapping information that associates the first VTEP with the first transport protocol information in the form of a first port number; and
    learning the second mapping information that associates the second VTEP with the second transport protocol information in the form a second port number that is different from the first port number.

3. The method of claim 1, wherein learning the first mapping information and the second mapping information comprises:

learning the first mapping information and the second mapping information associating respective first VTEP and second VTEP with the inner address information that includes one or more of the following: a media access control (MAC) address and an Internet Protocol (IP) address assigned to both the first virtualized computing instance and the second virtualized computing instance.

4. The method of claim 1, wherein learning the first mapping information and the second mapping information comprises at least one of the following:
learning the first mapping information based on a first prior encapsulated packet from the first VTEP, wherein the first prior encapsulated packet includes (a) a first outer header specifying the first VTEP and (b) a first ingress packet specifying the inner address information and the first transport protocol information; and
learning the second mapping information based on a second prior encapsulated packet from the second VTEP, wherein the second prior encapsulated packet includes (a) a second outer header specifying the second VTEP and (b) a second ingress packet specifying the inner address information and the second transport protocol information.

5. The method of claim 1, wherein learning the first mapping information and the second mapping information comprises at least one of the following:
learning the first mapping information or the second mapping information, or both, based on programming instructions from a network management entity.

6. The method of claim 1, wherein learning the first mapping information and the second mapping information comprises at least one of the following:
learning the inner address information that is translated by multiple translators capable of performing source network address translation (NAT) for the respective first virtualized computing instance and second virtualized computing instance;
learning the inner address information that is assigned to multiple backend servers to interact with a load balancer supported by the computer system, wherein the multiple backend servers include the first virtualized computing instance and the second virtualized computing instance.

7. The method of claim 1, wherein learning the first mapping information comprises:
learning, in a flow cache, the first mapping information that includes first ingress information based on a first ingress packet that is processed to generate and send a first egress packet towards the first VTEP; and
learning, in the flow cache, the first mapping information that further includes first egress information based on the first egress packet to specify the first VTEP, a first output logical router interface and a first physical interface at the computer system.

8. A non-transitory computer-readable storage medium that includes a set of instructions which, in response to execution by a processor of a computer system, cause the processor to perform a method of virtual tunnel endpoint (VTEP) learning based on transport protocol information, wherein the method comprises:
learning first mapping information that associates (a) a first VTEP with (b) first transport protocol information and inner address information associated with a first virtualized computing instance;
learning second mapping information that associates (a) a second VTEP with (b) second transport protocol information and the inner address information associated with a second virtualized computing instance;
detecting an egress packet that is addressed to the inner address information associated with both the first virtualized computing instance and the second virtualized computing instance; and
in response to determination that the egress packet specifies the first transport protocol information, generating and sending a first encapsulated packet that includes the egress packet towards the first VTEP based on the first mapping information;
otherwise, in response to determination that the egress packet specifies the second transport protocol information, generating and sending a second encapsulated packet that includes the egress packet towards the second VTEP based on the second mapping information.

9. The non-transitory computer-readable storage medium of claim 8, wherein learning the first mapping information and the second mapping information comprises:
learning the first mapping information that associates the first VTEP with the first transport protocol information in the form of a first port number; and
learning the second mapping information that associates the second VTEP with the second transport protocol information in the form a second port number that is different from the first port number.

10. The non-transitory computer-readable storage medium of claim 8, wherein learning the first mapping information and the second mapping information comprises:
learning the first mapping information and the second mapping information associating respective first VTEP and second VTEP with the inner address information that includes one or more of the following: a media access control (MAC) address and an Internet Protocol (IP) address assigned to both the first virtualized computing instance and the second virtualized computing instance.

11. The non-transitory computer-readable storage medium of claim 8, wherein learning the first mapping information and the second mapping information comprises at least one of the following:
learning the first mapping information based on a first prior encapsulated packet from the first VTEP, wherein the first prior encapsulated packet includes (a) a first outer header specifying the first VTEP and (b) a first ingress packet specifying the inner address information and the first transport protocol information; and
learning the second mapping information based on a second prior encapsulated packet from the second VTEP, wherein the second prior encapsulated packet includes (a) a second outer header specifying the second VTEP and (b) a second ingress packet specifying the inner address information and the second transport protocol information.

12. The non-transitory computer-readable storage medium of claim 8, wherein learning the first mapping information and the second mapping information comprises at least one of the following:
learning the first mapping information or the second mapping information, or both, based on programming instructions from a network management entity.

13. The non-transitory computer-readable storage medium of claim 8, wherein learning the first mapping information and the second mapping information comprises at least one of the following:

learning the inner address information that is translated by multiple translators capable of performing source network address translation (NAT) for the respective first virtualized computing instance and second virtualized computing instance;

learning the inner address information that is assigned to multiple backend servers to interact with a load balancer supported by the computer system, wherein the multiple backend servers include the first virtualized computing instance and the second virtualized computing instance.

14. The non-transitory computer-readable storage medium of claim 8, wherein learning the first mapping information comprises:

learning, in a flow cache, the first mapping information that includes first ingress information based on a first ingress packet that is processed to generate and send a first egress packet towards the first VTEP; and learning, in the flow cache, the first mapping information that further includes first egress information based on the first egress packet to specify the first VTEP, a first output logical router interface and a first physical interface at the computer system.

15. A computer system, comprising:

a local virtual tunnel virtualized computing instance (VTEP) to establish a first logical overlay tunnel with a first VTEP associated with a first virtualized computing instance, and a second logical overlay tunnel with a second VTEP associated with a second virtualized computing instance; and a VTEP learning agent to:

learn first mapping information that associates (a) the first VTEP with (b) first transport protocol information and inner address information associated with the first virtualized computing instance;

learn second mapping information that associates (a) the second VTEP with (b) second transport protocol information and the inner address information associated with the second virtualized computing instance;

detect an egress packet that is addressed to the inner address information associated with both the first virtualized computing instance and the second virtualized computing instance; and in response to determination that the egress packet specifies the first transport protocol information, generate and send a first encapsulated packet that includes the egress packet towards the first VTEP based on the first mapping information;

otherwise, in response to determination that the egress packet specifies the second transport protocol information, generate and send a second encapsulated packet that includes the egress packet towards the second VTEP based on the second mapping information.

16. The computer system of claim 15, wherein the VTEP learning agent is to learn the first mapping information and the second mapping information by performing the following:

learn the first mapping information that associates the first VTEP with the first transport protocol information in the form of a first port number; and learn the second mapping information that associates the second VTEP with the second transport protocol information in the form a second port number that is different from the first port number.

17. The computer system of claim 15, wherein the VTEP learning agent is to learn the first mapping information and the second mapping information by performing the following:

learn the first mapping information and the second mapping information associating respective first VTEP and second VTEP with the inner address information that includes one or more of the following: a media access control (MAC) address and an Internet Protocol (IP) address assigned to both the first virtualized computing instance and the second virtualized computing instance.

18. The computer system of claim 15, wherein the VTEP learning agent is to learn the first mapping information and the second mapping information by performing the following:

learn the first mapping information based on a first prior encapsulated packet from the first VTEP, wherein the first prior encapsulated packet includes (a) a first outer header specifying the first VTEP and (b) a first ingress packet specifying the inner address information and the first transport protocol information; and learn the second mapping information based on a second prior encapsulated packet from the second VTEP, wherein the second prior encapsulated packet includes (a) a second outer header specifying the second VTEP and (b) a second ingress packet specifying the inner address information and the second transport protocol information.

19. The computer system of claim 15, wherein the VTEP learning agent is to learn the first mapping information and the second mapping information by performing the following:

learn the first mapping information or the second mapping information, or both, based on programming instructions from a network management entity.

20. The computer system of claim 15, wherein the VTEP learning agent is to learn the first mapping information and the second mapping information by performing the following:

learn the inner address information that is translated by multiple translators capable of performing source network address translation (NAT) for the respective first virtualized computing instance and second virtualized computing instance;

learn the inner address information that is assigned to multiple backend servers to interact with a load balancer supported by the computer system, wherein the multiple backend servers include the first virtualized computing instance and the second virtualized computing instance.

21. The computer system of claim 15, wherein the VTEP learning agent is to learn the first mapping information by performing the following:

learn, in a flow cache, the first mapping information that includes first ingress information based on a first ingress packet that is processed to generate and send a first egress packet towards the first VTEP; and learn, in the flow cache, the first mapping information that further includes first egress information based on the first egress packet to specify the first VTEP, a first output logical router interface and a first physical interface at the computer system.

* * * * *